United States Patent
Kim et al.

(10) Patent No.: US 9,075,236 B2
(45) Date of Patent: Jul. 7, 2015

(54) LASER SENSOR ASSEMBLY AND CONTROL METHOD OF THE SAME

(71) Applicant: SAMSUNG TECHWIN CO., LTD., Changwon (KR)

(72) Inventors: Bae-Jin Kim, Changwon (KR); Minsu Kim, Changwon (KR)

(73) Assignee: SAMSUNG TECHWIN CO., LTD., Changwon (KR)

( * ) Notice: Subject to any disclaimer, the term of this patent is extended or adjusted under 35 U.S.C. 154(b) by 124 days.

(21) Appl. No.: 14/021,213

(22) Filed: Sep. 9, 2013

(65) Prior Publication Data
US 2014/0145063 A1    May 29, 2014

(30) Foreign Application Priority Data
Nov. 28, 2012    (KR) .................. 10-2012-0136547

(51) Int. Cl.
*G01J 1/04* (2006.01)
*G02B 26/10* (2006.01)
*G02B 7/00* (2006.01)

(52) U.S. Cl.
CPC . *G02B 26/10* (2013.01); *G01J 1/04* (2013.01); *G02B 7/003* (2013.01)

(58) Field of Classification Search
CPC .......... G01J 1/04; G01J 1/0403; G02B 7/003; G02B 26/10; G02B 7/005
USPC .............. 250/208.1, 233, 234, 235, 236, 239, 250/216, 221, 222.1, 231.13, 231.14, 250/231.15, 231.17
See application file for complete search history.

(56) References Cited

U.S. PATENT DOCUMENTS 5,896,035 A * 4/1999 Takahashi ................ 324/754.23
8,107,146 B2    1/2012 Noh et al.

FOREIGN PATENT DOCUMENTS

| KR | 1999-0055096 A | 7/1999 |
| KR | 10-1004839 B1 | 12/2010 |
| KR | 10-2011-0029331 A | 3/2011 |

* cited by examiner

*Primary Examiner* — Georgia Y Epps
*Assistant Examiner* — Don Williams
(74) *Attorney, Agent, or Firm* — Sughrue Mion, PLLC

(57) ABSTRACT

Provided is a laser sensor assembly and a method of controlling the laser sensor assembly. A laser sensor assembly includes a supporting unit; a rotary shaft unit formed onto the supporting unit, wherein the rotary shaft unit is rotatable, and has at least one bent portion to form a certain angle with respect to a rotational axis of the rotary shaft unit; and a laser sensor unit coupled with the bent part of the rotary shaft unit to form a certain angle with respect to the rotational axis of the rotary shaft unit.

20 Claims, 10 Drawing Sheets

13

LASER SENSOR ASSEMBLY AND CONTROL METHOD OF THE SAME

CROSS-REFERENCE TO RELATED PATENT APPLICATION

This application claims priority from Korean Patent Application No. 10-2012-0136547, filed on Nov. 28, 2012, in the Korean Intellectual Property Office, the disclosure of which is incorporated herein in its entirety by reference.

BACKGROUND

1. Field

Apparatuses and methods consistent with exemplary embodiments relate to a laser sensor assembly and controlling the laser sensor assembly.

2. Description of the Related Art

A laser sensor assembly is applied on various devices. The laser sensor assembly includes a laser sensor to scan objects positioned in front of the laser sensor and generate images, or set control standards.

The laser sensor assembly scans a front side through various motions. A laser sensor assembly may set observation ranges in various directions by performing a pitching motion. A scan area set by using the laser sensor assembly is described below.

FIG. 1 is a perspective view illustrating a measurement range of a related art laser sensor assembly. Referring to FIG. 1, a laser sensor 13 of a laser sensor assembly (not shown) is disposed in the center, and a scan area may be set through the pitching motion as described above. As illustrated in FIG. 1, the scan area covers a certain area. However, when a general pitching motion, as described above, is performed, a portion of the scan area may be blind spots. Accordingly, the laser sensor 13 may not be able to scan the blind spots, and thus, an image of the front side of the laser sensor assembly may not be embodied clearly.

SUMMARY

One or more exemplary embodiments provide a laser sensor assembly which moves three-dimensionally to reduce blind spots when sensing objects, and a method of controlling the laser sensor assembly.

According to an aspect of an exemplary embodiment, there is provided a supporting unit; a supporting unit; a rotary shaft unit rotatably formed on the supporting unit and having at least one portion which is bent with respect to a rotational axis of the rotary shaft unit; and a laser sensor unit coupled to the bent part of the rotary shaft unit so that the laser sensor unit is inclined with respect to the rotational axis of the rotary shaft unit.

The rotary shaft unit may include a first rotary member rotatably formed on the supporting unit; and a second rotary member coupled to the first rotary member to form a first angle with respect to the first rotary member.

The rotary shaft unit may further include a first angle adjusting unit formed between the first and second rotary members to adjust the first angle.

The first angle adjusting unit may adjust the first angle according to a moving speed of the laser sensor unit.

The rotary shaft unit may further include a third rotary member of which one end is coupled to the second rotary member to form a second angle with respect to the second rotary member, and the other end of the third rotary member may be coupled to the laser sensor unit The first angle and the second angles may be formed differently.

The rotary shaft unit may further include a second angle adjusting unit formed between the second rotary member and the third rotary member to adjust the second angle.

The laser sensor assembly according to the present embodiment may further include a guiding unit, in which a portion thereof is inserted in the supporting unit to limit a movement of the laser sensor unit.

The laser sensor assembly according to the present embodiment may further include a driving unit which is coupled to the rotary shaft to rotate the rotary shaft unit.

According to an aspect of another exemplary embodiment, there is provided a laser sensor assembly including a supporting unit; a rotary shaft unit rotatably formed on the supporting unit; a connecting link unit formed on the rotary shaft unit to form a first angle with respect to the rotary shaft unit, the connecting link unit being linearly movable; and a laser sensor unit coupled to the connecting link unit.

The rotary shaft unit may include a rotary shaft formed on the supporting unit to be rotatable; and a rotary plate coupled to the rotary shaft and the connecting link unit, in which the connecting link unit is coupled to form the first angle with respect to the rotary plate and is linearly movable.

The rotary shaft unit may further include a first angle adjusting unit formed on the rotary plate or the supporting unit, in which the first angle adjusting unit linearly moves one end of the connecting link unit that is coupled to the rotary shaft unit.

The first angle adjusting unit may adjust the first angle according to a moving speed of the laser sensor unit.

The laser sensor assembly according to the present embodiment may further include a guiding unit, in which a portion thereof is inserted in the supporting unit to limit a movement of the laser sensor unit.

The laser sensor assembly according to the present embodiment may further include a driving unit coupled to the rotary shaft unit and rotates the rotary shaft unit.

According to an aspect of still another exemplary embodiment, there is provided a method of controlling a laser sensor assembly including: rotating a rotary shaft unit provided to form a certain angle with respect to a moving direction of an external device on which the laser sensor assembly is installed; scanning a front side of the external device in two dimensions by using a laser sensor unit which rotates according to the rotation of the rotary shaft unit; and converting data of the two-dimensionally scanned front side of the external device to three-dimensional data and displaying the three-dimensional data.

The laser sensor unit may rotate and linearly move up and down simultaneously.

The laser sensor unit may be disposed to form a certain angle with the rotary shaft unit.

The angle formed between the rotary shaft unit and the laser sensor unit may change according to a moving speed of the external device.

The rotary shaft unit may be rotated by a driving unit which is coupled thereto.

BRIEF DESCRIPTION OF THE DRAWINGS

The above and other aspects will become more apparent by describing in detail exemplary embodiments with reference to the attached drawings, in which.

DETAILED DESCRIPTION OF THE EXEMPLARY EMBODIMENTS

The inventive concept now will be described more fully hereinafter with reference to the accompanying drawings, in which exemplary embodiments are shown. The inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art.

The terminology used herein is for the purpose of describing particular embodiments only and is not intended to limit the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Also, it will be understood that although the terms first and second are used herein to describe various elements, these elements should not be limited by these terms. These terms are only used to distinguish one element from another element. Moreover, expressions such as "at least one of," when preceding a list of elements, modify the entire list of elements and do not modify the individual elements of the list.

A laser sensor assembly may be applied to various devices. The laser sensor assembly may be installed on an external device to scan an object disposed in a certain direction of the external device. The laser sensor assembly irradiates laser toward a moving direction of the external device to scan various objects. Also, an external device may include various devices. For example, an external device may be stationary or movable.

Hereinafter, for the convenience of description, exemplary embodiments will be described with respect to a case where an external device is movable. Also, description about the external device will be omitted, and the laser sensor assembly 100 mainly described in detail.

Figure 1:
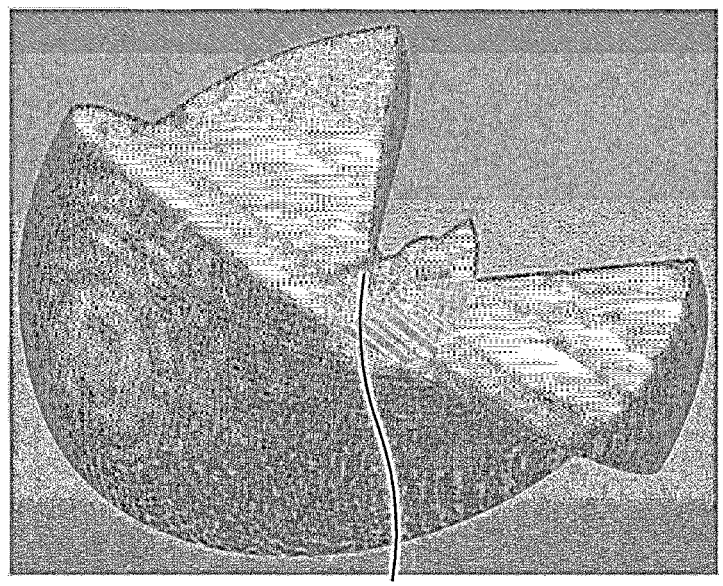
FIG. 1 is a perspective view illustrating a measurement range of a related art laser sensor assembly.
Figure 2:
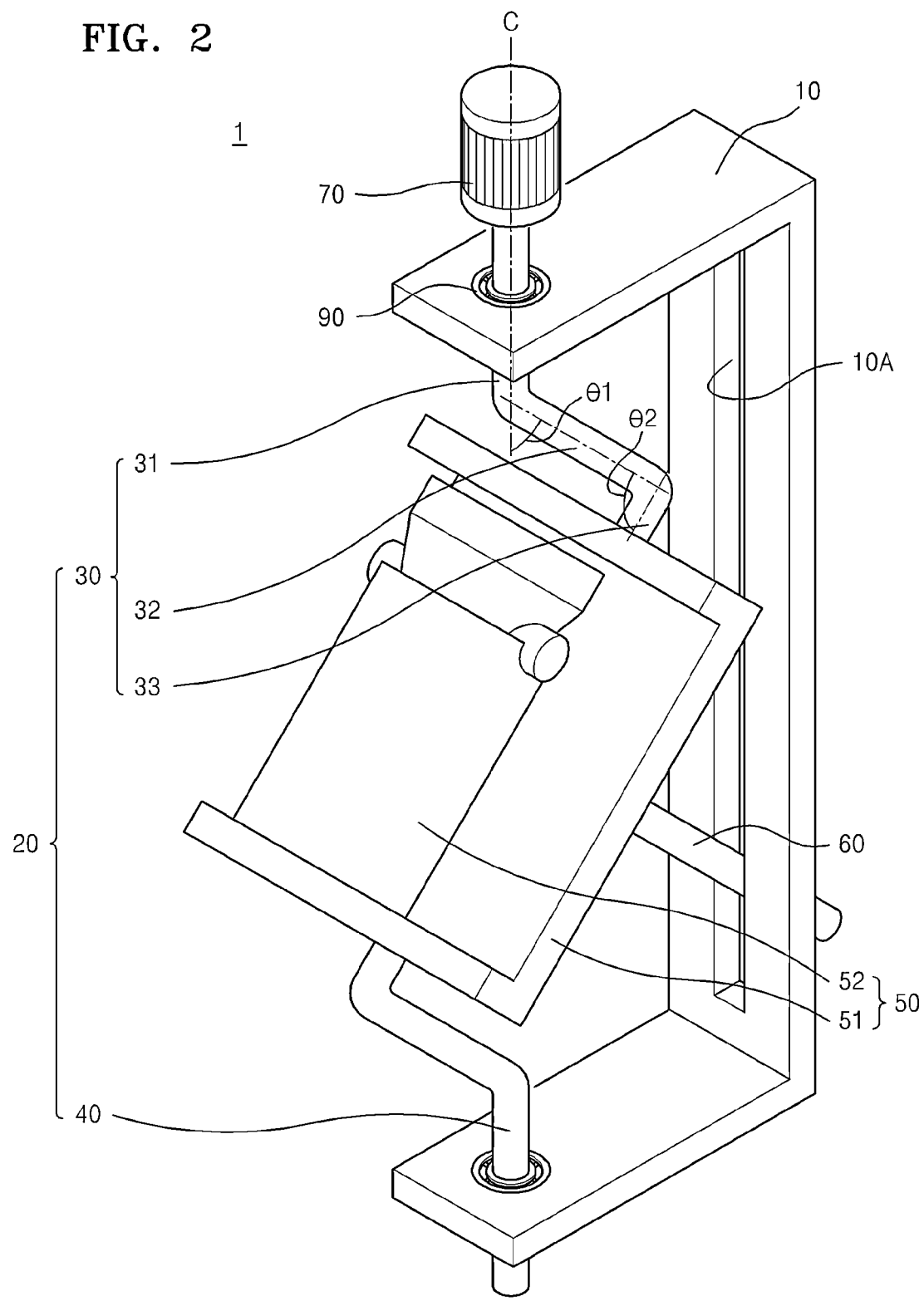
FIG. 2 is a perspective view illustrating a laser sensor assembly according to an exemplary embodiment of the present invention.

FIG. 2 is a perspective view illustrating a laser sensor assembly 1 according to an exemplary embodiment. Referring to FIG. 2, the laser sensor assembly 1 may include a supporting unit 10. The supporting unit 10 may be fixed on an external device in various ways. For example, the supporting unit 10 may be fixed on the external device by using a separate fixing member (not shown) or by welding.

The laser sensor assembly 1 may include a rotary shaft unit 20 that is rotatably provided on the supporting unit 10 and has at least one bent portion to form a certain angle with respect to a rotational axis of the rotary shaft unit 20. In specific, the rotary shaft unit 20 may be provided such that one end thereof is rotatable on the supporting unit 10. Also, a portion of the rotary shaft unit 20 which is formed on the supporting unit 10 may be bent.

The laser sensor assembly 1 may include a laser sensor unit 50 which is coupled to the bent portion of the rotary shaft unit 20, forming a certain angle with respect to the rotational axis of the rotary shaft unit 20. The laser sensor unit 50 may irradiate laser toward the front area to scan objects therein. Also, the laser sensor unit 50 may perform a relative motion with the rotary shaft unit 20. In detail, the laser sensor unit 50 may perform a three-dimensional motion according to a rotational motion of the rotary shaft unit 20.

The laser assembly 1 may include a guiding unit 60 that is partially inserted in the supporting unit 10 to limit the movement of the laser sensor unit 50. One end of the guiding unit 60 is inserted in the supporting unit 10, and the other end thereof may be coupled to the laser sensor unit 50. The one end of the guiding unit 60 which is inserted in the supporting unit 10 may be linearly moved along the supporting unit 10 to limit the movement of the laser sensor unit 50.

The laser sensor assembly 1 may include a driving unit 70 which is coupled to the rotary shaft unit 20 to rotate the rotary shaft unit 20. The driving unit 70 may include a motor which is operated according to external signals. The driving unit 70 may include various motors to control a rotating speed and a degree of rotation of the rotary shaft unit 20.

Hereinafter, the supporting unit 10, the rotary shaft unit 20, the laser sensor unit 50, the guiding unit 60, and the driving unit 70 will be described in detail.

The supporting unit 10 may formed to have a portion of the rotary shaft 20 be inserted therein. A portion of the supporting unit 10 may be bent. The supporting unit 10 may be formed to cover a portion of the laser sensor unit 50.

Also, a guiding hole 10A may be formed in the supporting unit 10 for the guiding unit 60 to be inserted therein and linearly moved. The guiding hole 10A may be formed toward a back side of the laser sensor 50. The guiding hole 10A may be formed as a shape of a long slot. Therefore, one end of the guiding unit 60 may be inserted in the guiding hole 10A and linearly moved therein.

The rotary shaft unit 20 may be provided in plural numbers. The plurality of the rotary shaft units 20 may be rotatably formed on the bent part of each supporting unit 10. Also, each of the rotary shaft units 20 may be formed on the supporting unit 10 to face each other, and coupled to the laser sensor unit 50. The plurality of the rotary shaft units 20 may include a first rotary shaft unit 30, disposed between the supporting unit 10 and the laser sensor unit 50, and a second rotary shaft unit 40, disposed between the supporting unit 10 and the laser sensor unit 50 on an opposite side of the first rotary shaft unit 30 with respect to the laser sensor unit 50. The first and second rotary shaft units 30 and 40 may be formed similarly to each other.

Hereinafter, for the convenience of description, the first rotary shaft unit 30 will be mainly described in detail.

The first rotary shaft unit 30 may include a first rotary member 31 rotatably formed on the supporting unit 10. The first rotary member 31 may be a central rotary shaft of the first rotary shaft unit 30. The first rotary member 31 may be rotatably coupled to the driving unit 70. When the first rotary member 31 is rotated, a second rotary member 32 and a third rotary member 33 may be rotated around the first rotary member 31 as a center of the rotation.

The first rotary member 30 may include the first rotary member 32 which is coupled thereto to form a first angle θ1 with respect to the first rotary member 31. The first angle θ1 may be various values. For example, the first angle θ1 may be zero, or an obtuse angle or an acute angle, particularly in a range from zero to 120 degrees.

The first rotary shaft unit 30 may include a third rotary member 33 which is coupled to the second rotary member 32, forming a second angle θ2 with respect to the second rotary member 32, and the laser sensor unit 50. Similar to the first angle θ1, the second angle θ2 may be zero, or an obtuse angle or an acute angle.

In addition, the first and second angles θ1 and θ2 may be formed differently. For example, if the first angle θ1 is an acute angle, the second angle θ2 may be an obtuse angle, and if the first angle θ1 is an obtuse angle, the second angle θ2 may be an acute angle. However, hereinafter, for the convenience of description, a case where the first angle θ1 is an acute angle and the second angle θ2 is 90 degrees will be mainly described in detail.

The above-described first, second, and third rotary members 31, 32 and 33 may be formed using similar materials and shapes. For example, the first, second, and third rotary members 31, 32 and 33 may be formed of metal in a cylindrical shape. However, the first, second, and third rotary members 31, 32 and 33 are not limited thereto, and may be formed in other various materials and shapes.

The first, second, and third rotary members 31, 32 and 33 may be integrally formed. For example, the first rotary member 31 may be connected to the second rotary member 32. A first angle θ1 between the first rotary member 31 and the second rotary member 32 may be fixed. Also, the second rotary member 32 may be connected to the third rotary member 33. A second angle θ2 between the second rotary member 32 and the third rotary member 33 may be fixed. As described above, the laser sensor unit 150 may perform a relative motion with respect to the rotary shaft unit 20. The laser sensor unit 50 may include a laser sensor 52 which irradiates laser, and a bracket 51 coupled to the rotary shaft unit 20 and having the laser sensor 52 accommodated thereon. The laser sensor 52 may sense objects in two dimensions with respect to a direction in which an external device moves. In specific, the laser sensor 52 may include a two-dimensional scanner (not shown).

The two-dimensionally scanned data with respect to the moving direction of the external device may be converted to a three-dimensional data later to form a three-dimensional scanned data with respect to the moving direction thereof. The above converted three-dimensional data may be displayed on a display unit (not shown) provided in an external device or outside the laser sensor assembly 1.

A portion of the bracket 51 may be bent. The bracket 51 may be formed to cover a portion of the laser sensor and the bracket 51 may be coupled to the rotary shaft unit 20. In specific, the bracket 51 may be coupled to the third rotary member 33 and a corresponding third rotary member of the second rotary shaft unit 40. As described above, when the bracket 51 is coupled to the first and second rotary shaft units 30 and 40, the bracket 51 may form a certain angle with respect to the first rotary member 31. Therefore, the bracket 51 may perform a three-dimensional motion according to the rotation of the first rotary member 31.

The guiding unit 60 may be coupled to the bracket 51. One end of the guiding unit 60 may be coupled to the bracket 51, and the other end thereof may be inserted in the guiding hole 10A of the supporting unit 10. When the bracket 51 performs a three-dimensional motion, the guiding unit 60 may be linearly moved in the guiding hole 10A, and thus, limit the movement range of the bracket 51.

Hereinafter, an operation of the laser sensor assembly 1 will be described in detail.

Figure 3:
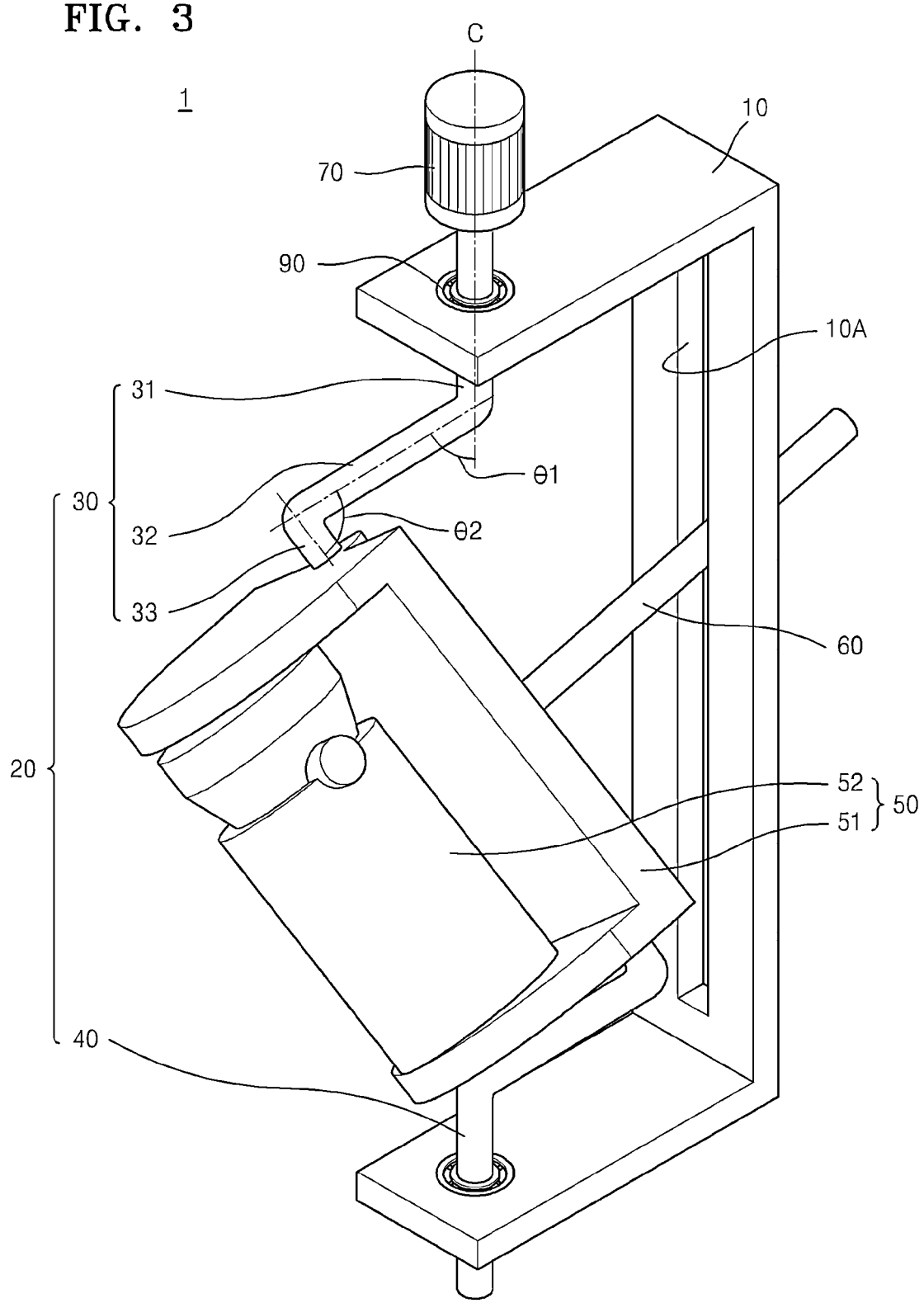
FIG. 3 is an operation view illustrating a first operation of the laser sensor assembly of FIG. 2, according to an exemplary embodiment.

FIG. 3 is an operation view of a first operation of the laser sensor assembly 1 of FIG. 2.

Referring to FIG. 3, when an external device is moved, the laser sensor assembly 1 is operated. The laser sensor assembly 1 performs three-dimensional motion, and thus, scans objects disposed in the moving direction of the external device.

When the driving unit 70 is operated, the first rotary shaft unit 30 may be rotated. Here, the driving unit 70 may rotate the first rotary member 31. The first rotary member 31 may be rotated in a state of being inserted in the supporting unit 10.

When the first rotary member 31 is rotated, the second rotary member 32 may be rotated also. Here, the second rotary member 32 may be rotated, in a state of having one end of the first rotary member 31 as a center of the rotation. In specific, the one end of the second rotary member 32 may be moved in a fan-shaped form with respect to a part of the one end which is connected to the first rotary member 31.

The third rotary member 33 may rotate according to the rotation of the second rotary member 32, and may be rotated similarly as the second rotary member 32.

When the first, second and third rotary members 31, 32 and 33 are being rotated as described above, the first rotary shaft unit 30 and the second rotary shaft unit 40 may be rotated simultaneously. Here, a bearing 90 may be disposed between the first rotary shaft unit 30 and the supporting unit 10, and between the second rotary shaft unit 40 and the supporting unit 10 to reduce friction therebetween.

When the first and second rotary shaft units 30 and 40 are being rotated as describe above, the bracket 51 may be rotated together with the first and second rotary shaft units 30 and 40. Also, the bracket 51 may twist vertically or horizontally without rotating. A laser sensor 52 may move along with the bracket 51. While moving as described above, the laser sensor 62 may measure a certain range in the moving direction of an external device.

When the bracket 51 is being moved as describe above, the guiding unit 60 may linearly move in a guiding hole 10A according to the movement of the bracket 51. Here, as the bracket 51 twists vertically or horizontally, the guiding unit 60 may twist in the same way as that of the bracket 51. Therefore, the guiding unit 60 may linearly move following the guiding hole 10A without leaving the guiding hole 10A. Therefore, the guiding unit 60 may limit the movement range of the bracket 51, and prevent the bracket 51 from moving out of the movement range.

When the guiding unit 60 and the bracket 51 are moving as describe above, the external device may be moving continuously. Here, the external device may include a speed sensor (not shown) which measures a moving speed of the external device. Also, the external device may include a controlling unit (not shown), which controls the driving unit 70.

The moving speed of the external device measured by the speed sensor may be transferred to the controlling unit. The controlling unit may calculate a moving speed of a laser sensor unit 50 based on the transferred moving speed.

Then, the controlling unit may control the driving unit 70 based on a calculated moving speed of the laser sensor unit 50. In specific, when the calculated moving speed of the laser sensor unit 50 is less than a certain speed, the controlling unit may control the driving unit 70 to maintain the rotating speed of the first rotary shaft unit 30 at a first speed. On the other hand, when the calculated moving speed of the laser sensor unit 50 exceeds a certain speed, the controlling unit may control the driving unit 70 to maintain the rotating speed of the first rotary shaft unit 30 at a second speed.

The first speed and the second speed may be different from each other. For example, the first speed may be set to be slower than the second speed.

When the controlling unit controls the driving unit 70 as described above, a scan range may be determined according to the moving speed of the external device. In specific, when the moving speed of the external device exceeds a certain speed, the controlling unit controls the driving unit 70 to maintain the rotating speed of the first rotary shaft unit 30 at the second speed. Accordingly, the scan range is narrowed compared to a case in which the rotating speed of the first rotary shaft unit 30 is the first speed, and thus, accurate scan data may be produced. On the other hand, when the speed of the external device is equal to or less than a certain speed, the controlling unit controls the driving unit 70 to maintain the rotating speed of the first rotary shaft unit 30 at the first speed so that a wide range may be scanned.

The laser sensor assembly 1 according to the present embodiment may be provided on an external device to scan various ranges. The laser sensor assembly 1 of the present embodiment reduces blind spots occurring when using a related art pitching method, and may accurately sense objects. Also, in the laser sensor assembly 1 of the present embodiment, the laser sensor 52 may perform a curvilinear motion using a simple structure. Therefore, a structure and a manufacturing process thereof may be simplified.

In order to embody the above-described motion, related art laser sensor assemblies perform a pitching motion, that is, a vertical motion. Due to a vibration generated from the vertical motion of a device, a vertical vibration may occur. In the related art laser sensor assemblies, resonance is also generated due to the motion of the device. In such a state, amplitude increases, and thus, a relatively large amount of energy or power is necessary to control the amplitude.

However, by using the laser sensor assembly 1 according to the present embodiment, the above-described motion may be embodied by a twisting motion which may cause less vibration and rotate more naturally compared to the pitching motion. Therefore, the laser sensor assembly 1 may rotate in a fast speed, and thus, precisely scan objects and increase a scanning speed.

Also, since the related art laser sensor assemblies only perform a pitching motion, a scan range may be limited. The related art laser sensor assemblies use a two-dimensional laser scanner which performs a vertical pitching motion. Thus, some of an upper-front range of an external device on which the related art laser sensor assemblies are installed may not be scanned. However, the laser sensor assembly 1 according to the present embodiment, may move the laser sensor 52 in three-dimensional directions, and thus, even when scanning two-dimensionally, the range of scan areas may be wider than that of the related art laser sensor assemblies.

Figure 4:
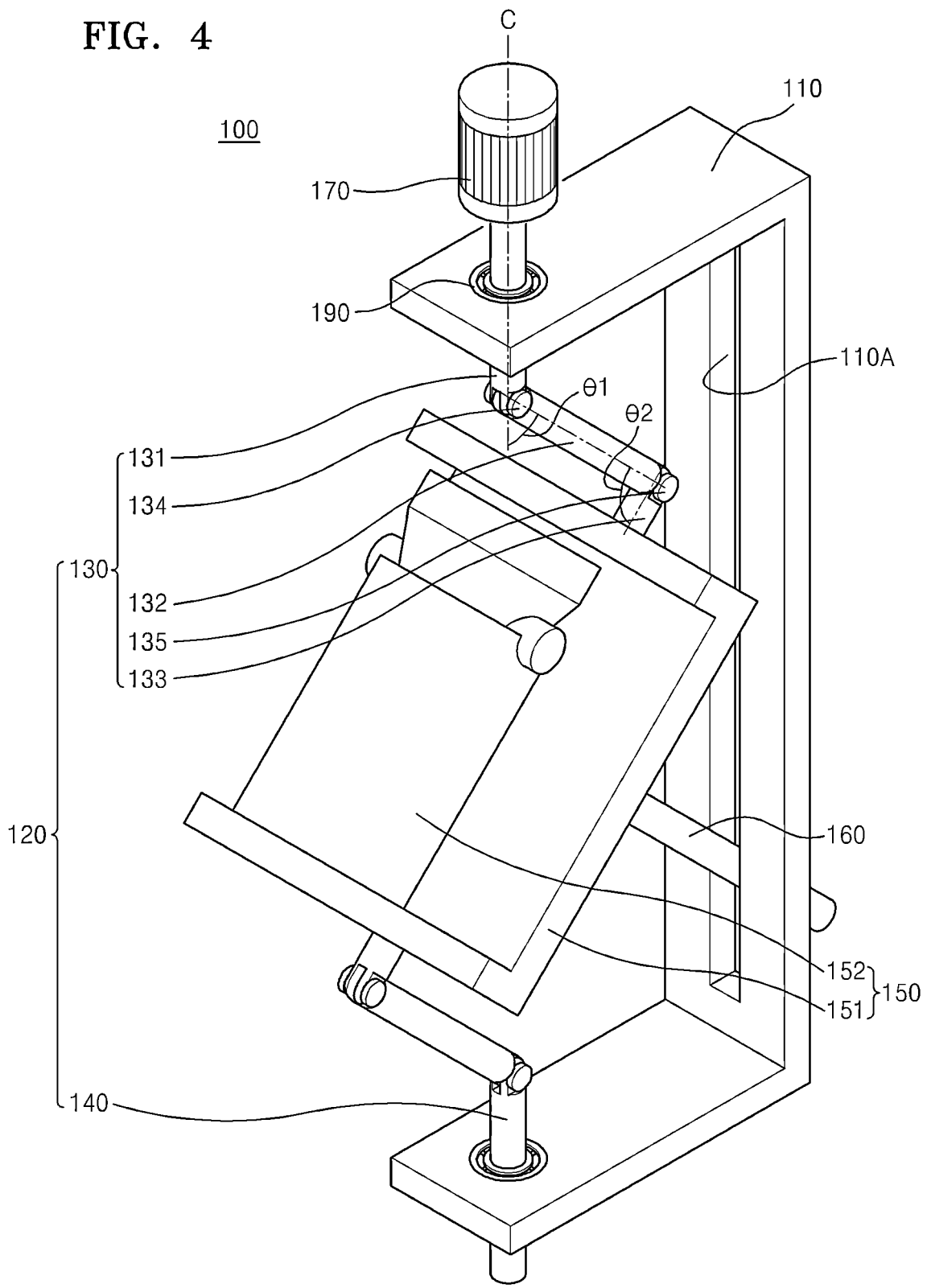
FIG. 4 is a perspective view illustrating a laser sensor assembly according to another exemplary embodiment.

FIG. 4 is a perspective view illustrating a laser sensor assembly 100 according to another exemplary embodiment. Referring to FIG. 4, the laser sensor assembly 100 may include a supporting unit 110. The supporting unit 110 may be fixed on an external device in various ways. For example, the supporting unit 110 may be fixed on the external device by using a separate fixing member (not shown) or by welding.

The laser sensor assembly 100 may include a rotary shaft unit 120 that is rotatably provided on the supporting unit 110 and has at least one bent portion to form a certain angle with respect to a rotational axis of the rotary shaft unit 120. In specific, the rotary shaft unit 120 may be provided such that one end thereof is rotatable on the supporting unit 110. Also, a portion of the rotary shaft unit 120 which is formed on the supporting unit 110 may be bent.

The laser sensor assembly 100 may include a laser sensor unit 150 which is coupled to the bent portion of the rotary shaft unit 120, forming a certain angle with respect to the rotational axis of the rotary shaft unit 120. The laser sensor unit 150 may irradiate laser toward the front area to scan objects therein. Also, the laser sensor unit 150 may perform a relative motion with the rotary shaft unit 120. In detail, the laser sensor unit 150 may perform a three-dimensional motion according to a rotational motion of the rotary shaft unit 120.

The laser assembly 100 may include a guiding unit 160 that is partially inserted in the supporting unit 110 to limit the movement of the laser sensor unit 150. One end of the guiding unit 160 is inserted in the supporting unit 110, and the other end thereof may be coupled to the laser sensor unit 150. The one end of the guiding unit 160 which is inserted in the supporting unit 110 may be linearly moved along the supporting unit 110 to limit the movement of the laser sensor unit 150.

The laser sensor assembly 100 may include a driving unit 170 which is coupled to the rotary shaft unit 120 to rotate the rotary shaft unit 120. The driving unit 170 may include a motor which is operated according to external signals. The driving unit 170 may include various motors to control a rotating speed and a degree of rotation of the rotary shaft unit 120.

Hereinafter, the supporting unit 110, the rotary shaft unit 120, the laser sensor unit 150, the guiding unit 160, and the driving unit 170 will be described in detail.

The supporting unit 110 may formed to have a portion of the rotary shaft 120 be inserted therein. A portion of the supporting unit 110 may be bent. The supporting unit 110 may be formed to cover a portion of the laser sensor unit 150.

Also, a guiding hole 110A may be formed in the supporting unit 110 for the guiding unit 160 to be inserted therein and linearly moved. The guiding hole 110A may be formed toward a back side of the laser sensor 150. The guiding hole 110A may be formed as a shape of a long slot. Therefore, one end of the guiding unit 160 may be inserted in the guiding hole 110A and linearly moved therein.

The rotary shaft unit 120 may be provided in plural numbers. The plurality of the rotary shaft units 120 may be rotatably formed on the bent part of each supporting unit 110. Also, each of the rotary shaft units 120 may be formed on the supporting unit 110 to face each other, and coupled to the laser sensor unit 150. The plurality of the rotary shaft units 120 may include a first rotary shaft unit 130, disposed between the supporting unit 110 and the laser sensor unit 150, and a second rotary shaft unit 140, disposed between the supporting unit 110 and the laser sensor unit 150 on an opposite side of the first rotary shaft unit 130 with respect to the laser sensor unit 150. The first and second rotary shaft units 130 and 140 may be formed similarly to each other. Hereinafter, for the convenience of description, the first rotary shaft unit 130 will be mainly described in detail.

The first rotary shaft unit 130 may include a first rotary member 131 rotatably formed on the supporting unit 110. The first rotary member 131 may be a central rotary shaft of the first rotary shaft unit 130. The first rotary member 131 may be rotatably coupled to the driving unit 170. When the first rotary member 131 is rotated, a second rotary member 132 and a third rotary member 133 may be rotated around the first rotary member 131 as a center of the rotation.

The first rotary member 130 may include the first rotary member 132 which is coupled thereto to form a first angle θ1 with respect to the first rotary member 131. The first angle θ1 may be various values. For example, the first angle θ1 may be zero, or an obtuse angle or an acute angle, particularly in a range from zero to 120 degrees.

The first rotary shaft unit 130 may include a third rotary member 133 which is coupled to the second rotary member 132, forming a second angle θ2 with regard to the second rotary member 132, and the laser sensor unit 150. Similar to the first angle θ1, the second angle θ2 may be zero, or an obtuse angle or an acute angle.

In addition, the first and second angles θ1 and θ2 may be formed differently. For example, if the first angle θ1 is an acute angle, the second angle θ2 may be an obtuse angle, and if the first angle θ1 is an obtuse angle, the second angle θ2 may be an acute angle. However, hereinafter, for the convenience of description, a case where the first angle θ1 is an acute angle and the second angle θ2 is 90 degrees will be mainly described in detail.

The above-described first, second, and third rotary members 131, 132 and 133 may be formed using similar materials and shapes. For example, the first, second, and third rotary members 131, 132 and 133 may be formed of metal in a cylindrical shape. However, the first, second, and third rotary members 131, 132 and 133 are not limited thereto, and may be formed in other various materials and shapes.

The first rotary shaft 130 may include a first angle adjusting unit 134 provided between the first and second rotary members 131 and 132. The first angle adjusting unit 134 may adjust the first angle θ1. In specific, the first angle adjusting unit 134 may adjust the first angle θ1 based on a moving speed of the laser sensor unit 150. For example, the first angle adjusting unit 134 may adjust the first angle θ1 in proportion to the moving speed of the laser sensor unit 150.

In addition, the first rotary unit 130 may include a second angle adjusting unit 135 formed between the second and third rotary members 132 and 133 to adjust the second angle θ2. The second angle adjusting unit 135 may be controlled similarly to the first angle adjusting unit 134. The second angle adjusting unit 135 may control the second angle θ2, which is adjusted according to the moving speed of the laser sensor unit 150, based on predetermined data in a tabular form.

The first and second angle adjusting units 134 and 135 may be formed in various ways. For example, at least one of the first and second angle adjusting units 134 and 135 may include a motor. Furthermore, at least one of the first and second angle adjusting units 134 and 135 may include a stepper motor. However, the first and second angle adjusting units 134 and 135 are not limited thereto, and may include any device which may be operated to adjust the angle of each rotary member.

Also, when the first and second angle adjusting units 134 and 135 are operated, a position of the first rotary member 131 may be moved. For example, when the first angle adjusting unit 134 is operated, and thus, the first angle θ1 increases, the first rotary member 131 may be moved toward the laser sensor unit 150. On the other hand, when the first angle adjusting unit 134 is operated, and thus, the first angle θ1 deceases, the first rotary member 131 may be moved away from the laser sensor unit 150.

For the second angle adjusting unit 135, the first rotary member 131 may be moved similarly to the movement of the first rotary member 131 when the first angle adjusting unit 134 is operated. Here, a bearing 190, which is disposed between the first rotary member 131 and the supporting unit 110, may include a sliding bearing.

As described above, the laser sensor unit 150 may perform a relative motion with respect to the rotary shaft unit 120. The laser sensor unit 150 may include a laser sensor 152 which irradiates laser, and a bracket 151 coupled to the rotary shaft unit 120 and having the laser sensor 152 accommodated thereon. The laser sensor 152 may scan objects in two dimensions with respect to a direction in which an external device moves. In specific, the laser sensor 152 may include a two-dimensional scanner (not shown).

The two-dimensionally scanned data with respect to the moving direction of the external device may be converted to a three-dimensional data later to form a three-dimensional scanned data with respect to the moving direction thereof. The above converted three-dimensional data may be displayed on a display unit (not shown) provided in an external device or outside the laser sensor assembly 100.

A portion of the bracket 151 may be bent. The bracket 151 may be formed to cover a portion of the laser sensor and the bracket 151 may be coupled to the rotary shaft unit 120. In specific, the bracket 151 may be coupled to the third rotary member 133 and a corresponding third rotary member of the second rotary shaft unit 140. As described above, when the bracket 151 is coupled to the first and second rotary shaft units 130 and 140, the bracket 151 may form a certain angle with respect to the first rotary member 131. Therefore, the bracket 151 may perform a three-dimensional motion according to the rotation of the first rotary member 131.

The guiding unit 160 may be coupled to the bracket 151. One end of the guiding unit 160 may be coupled to the bracket 151, and the other end thereof may be inserted in the guiding hole 110A of the supporting unit 110. When the bracket 151 performs a three-dimensional motion, the guiding unit 160 may be linearly moved in the guiding hole 110A and thus limit the movement range of the bracket 151.

Hereinafter, an operation of the laser sensor assembly 100 will be described in detail.

Figure 5:
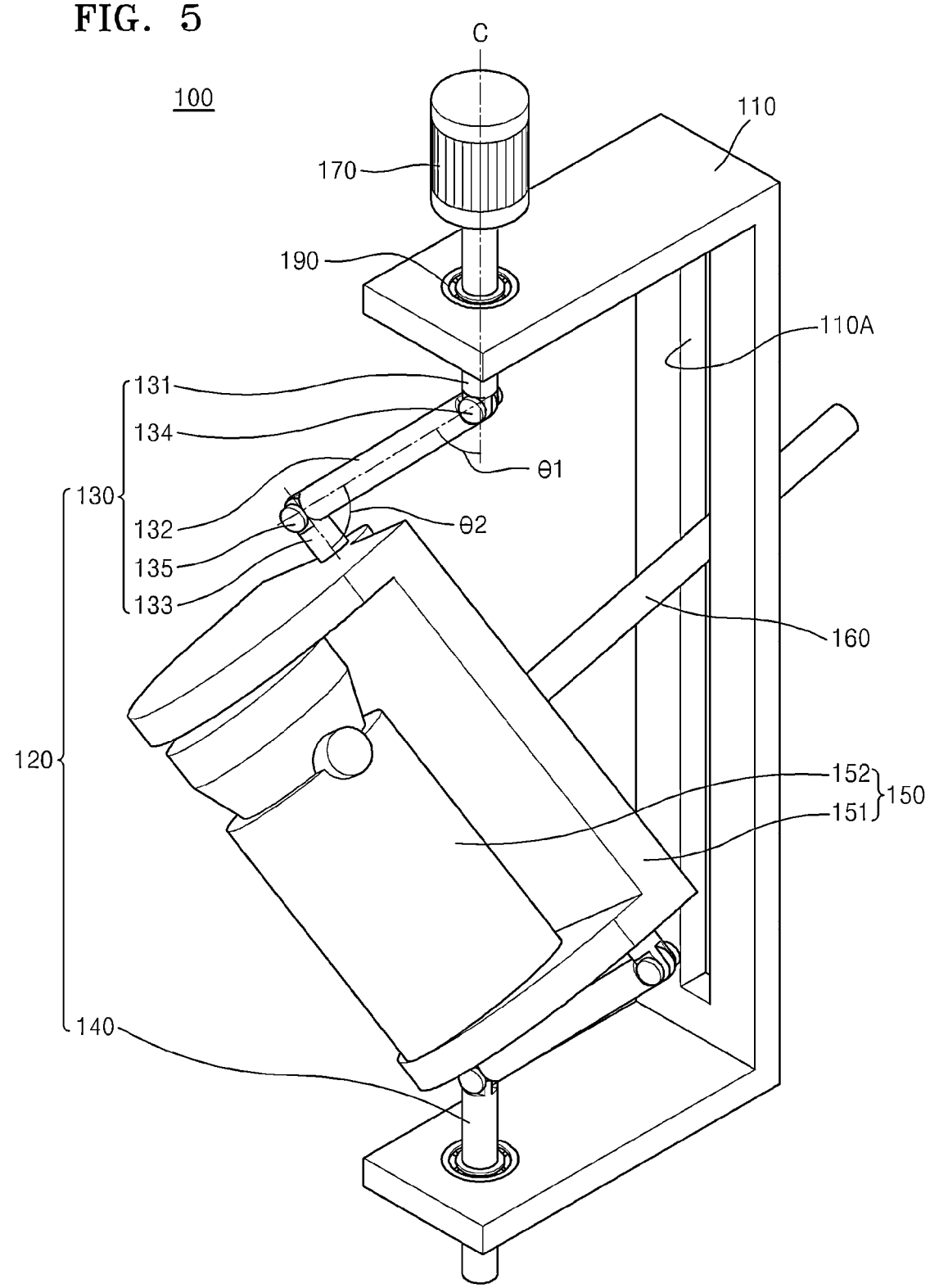
FIG. 5 is an operation view illustrating a first operation of the laser sensor assembly of FIG. 4, according to an exemplary embodiment.
Figure 6:
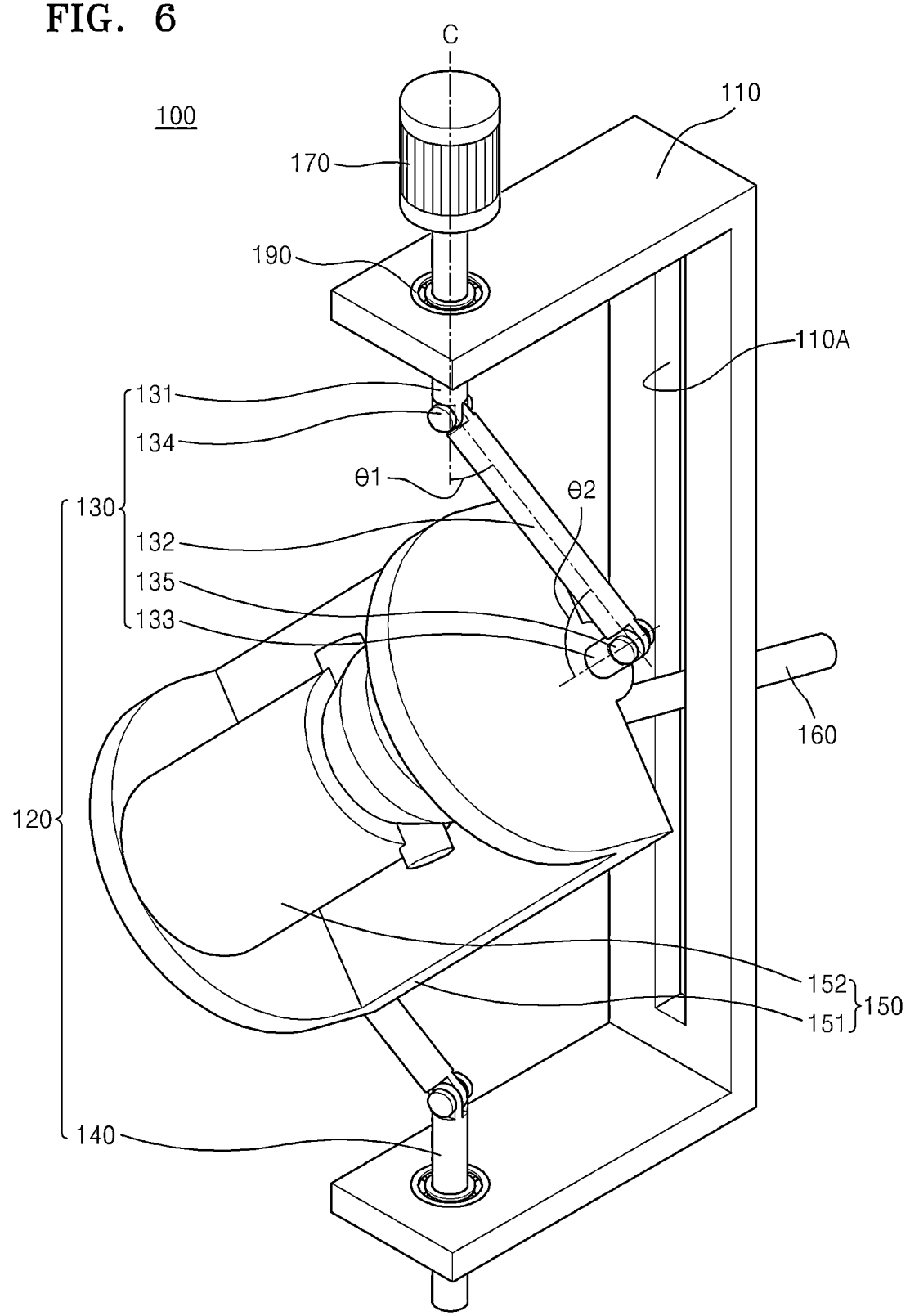
FIG. 6 is an operation view illustrating a second operation of the laser sensor assembly of FIG. 4, according to an exemplary embodiment.
Figure 7:
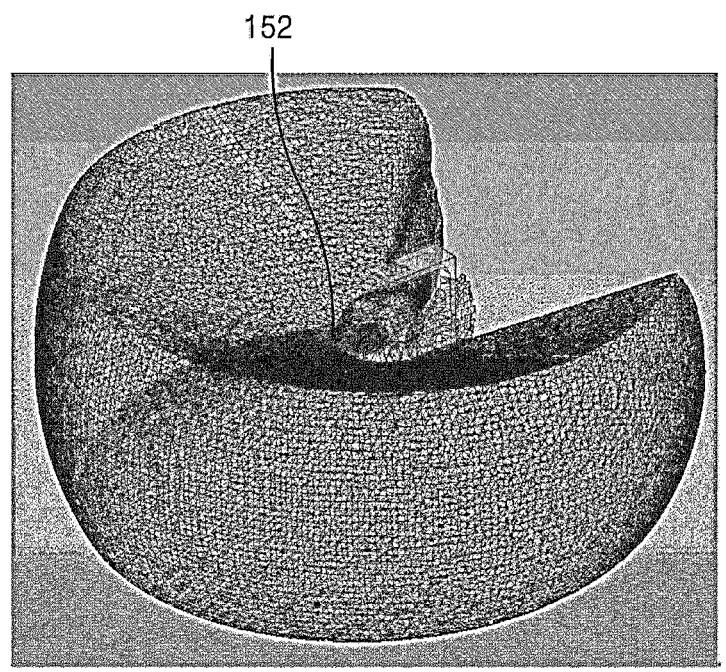
FIG. 7 is a perspective view illustrating a measurement range of the laser sensor assembly of FIG. 4, according to an exemplary embodiment.

FIG. 5 is an operation view of a first operation of the laser sensor assembly 100 of FIG. 4. FIG. 6 is an operation view of a second operation of the laser sensor assembly 100 of FIG. 4. FIG. 7 is a perspective view illustrating a measurement range of the laser sensor assembly 100 of FIG. 4.

Referring to FIGS. 5 to 7, when an external device is moved, the laser sensor assembly 100 is operated. The laser sensor assembly 100 performs a three-dimensional motion, and thus, scans objects disposed in the moving direction of the external device.

When the driving unit 170 is operated, the first rotary shaft unit 130 may be rotated. Here, the driving unit 170 may rotate the first rotary member 131. The first rotary member 131 may be rotated in a state of being inserted in the supporting unit 110.

When the first rotary member 131 is rotated, the second rotary member 132 may be rotated also. Here, the second rotary member 132 may be rotated, in a state of having one end of the first rotary member 131 as a center of the rotation. In specific, the one end of the second rotary member 132 may be moved in a fan-shaped form with respect to a part of the one end which is connected to the first rotary member 131.

The third rotary member 133 may rotate according to the rotation of the second rotary member 132, and may be rotated similarly as the second rotary member 132.

When the first, second and third rotary members 131, 132 and 133 are being rotated as described above, the first rotary shaft unit 130 and the second rotary shaft unit 140 may be rotated simultaneously. Here, the bearing 190 may be disposed between the first rotary shaft unit 130 and the supporting unit 110, and between the second rotary shaft unit 140 and the supporting unit 110 to reduce friction therebetween.

When the first and second rotary shaft units 130 and 140 are being rotated as describe above, the bracket 151 may be rotated together with the first and second rotary shaft units 130 and 140. Also, the bracket 151 may twist vertically or horizontally without rotating. A laser sensor 152 may move along with the bracket 151. While moving as described above, the laser sensor 162 may measure a certain range in the moving direction of an external device.

When the bracket 151 is being moved as describe above, the guiding unit 160 may linearly move in a guiding hole 110A according to the movement of the bracket 151. Here, as the bracket 151 twists vertically or horizontally, the guiding unit 160 may twist in the same way as that of the bracket 151. Therefore, the guiding unit 160 may linearly move following the guiding hole 110A without leaving the guiding hole 110A. Therefore, the guiding unit 160 may limit the movement range of the bracket 151, and prevent the bracket 151 from moving out of the movement range.

When the guiding unit 160 and the bracket 151 are moving as describe above, the external device may be moving continuously. Here, the external device may include a speed sensor (not shown) which measures a moving speed of the external device. Also, the external device may include a controlling unit (not shown), which controls the driving unit 170, the first angle adjusting unit 134 and the second angle adjusting unit 135.

The moving speed of the external device measured by the speed sensor may be transferred to the controlling unit. The controlling unit may calculate a moving speed of a laser sensor unit 150 based on the transferred moving speed.

Then, controlling unit may control the driving unit 170 based on a calculated moving speed of the laser sensor unit 150. In specific, when the calculated moving speed of the laser sensor unit 150 is less than a certain speed, the controlling unit may control the driving unit 170 to maintain the rotating speed of the first rotary shaft unit 130 at a first speed. On the other hand, when the calculated moving speed of the laser sensor unit 150 exceeds a certain speed, the controlling unit may control the driving unit 170 to maintain the rotating speed of the first rotary unit 130 at a second speed.

The first speed and the second speed may be different from each other. For example, the first speed may be set to be slower than the second speed.

Based on the calculated moving speed, the controlling unit may control at least one of the first and second angle adjusting units 134 and 135. When the controlling unit controls at least one of the first and second angle adjusting units 134 and 135, the first and second angle adjusting units 134 and 135 both may be similarly controlled. Hereinafter, for the convenience of description, an embodiment in which the controlling unit controls only the first angle adjusting unit 134 will be described in detail.

The controlling unit may control the first angle adjusting unit 134 based on the calculated moving speed of the laser sensor unit 150. Here, the controlling unit may adjust the first angle $\theta1$ by using the first angle adjusting unit 134.

In specific, the controlling unit may control the moving speed of the laser sensor unit 150 and the first angle $\theta1$ to be proportional to each other. For example, if the calculated moving speed of the laser sensor unit 150 is a first moving speed, the controlling unit may control the first angle adjusting unit 134 to set the first angle $\theta1$ at a first set angle. Also, if the calculated moving speed is a second moving speed, the controlling unit may control the first angle adjusting unit 134 to set the first angle $\theta1$ at a second set angle.

In this case, the first moving speed and the second moving speed may be different from each other. The first set angle and the second set angle may also be different from each other. In specific, the first moving speed may be slower than the second moving speed. Also, the first set angle may be smaller than the second set angle. For example, if the first moving speed and the second moving speed are 60 km/h and 80 km/h, respectively, then the first set angle and the second set angle may be 60 degrees and 80 degrees, respectively.

Therefore, when the first angle adjusting unit 134 is being controlled as described above, if an external device is moving fast, the scan range may be narrowed. Also, if an external device is moving slowly, the scan range may be widened.

When the first angle adjusting unit 134 is being controlled as described above, the scan range may be adjusted based on the moving speed of an external device. Therefore, objects may be accurately sensed based on the moving speed of the external device, and thus, the external device may be controlled quickly.

The laser sensor assembly 100 according to the present embodiment may be provided on an external device to scan various ranges. The laser sensor assembly 100 of the present embodiment reduces blind spots occurring when using a related art pitching method, and may accurately sense objects. Also, in the laser sensor assembly 100 of the present embodiment, the laser sensor 152 may perform a curvilinear motion using a simple structure. Therefore, a structure and a manufacturing process thereof may be simplified.

In order to embody the above-described motion, related art laser sensor assemblies perform a pitching motion, that is, a vertical motion. Due to a vibration generated from the vertical motion of a device, a vertical vibration may occur. In the related art laser sensor assemblies, resonance is also generated due to the motion of the device. In such a state, amplitude increases, and thus, a relatively large amount of energy or power is necessary to control the amplitude.

However, by using the laser sensor assembly 100 according to the present embodiment, the above-described motion may be embodied by a twisting motion which may cause less vibration and rotate more naturally compared to the pitching motion. Therefore, the laser sensor assembly 100 may rotate in a fast speed, and thus, precisely scan objects and increase a scanning speed.

Also, since the related art laser sensor assemblies only perform a pitching motion, a scan range may be limited. The related art laser sensor assemblies use a two-dimensional laser scanner which performs a vertical pitching motion. Thus, some of an upper-front range of an external device on which the related art laser sensor assemblies are installed may not be scanned. However, the laser sensor assembly 100 according to the present embodiment, may move the laser sensor 152 in three-dimensional directions, and thus, even when scanning two-dimensionally, the range of scan areas may be wider than that of the related art laser sensor assemblies.

Figure 8:
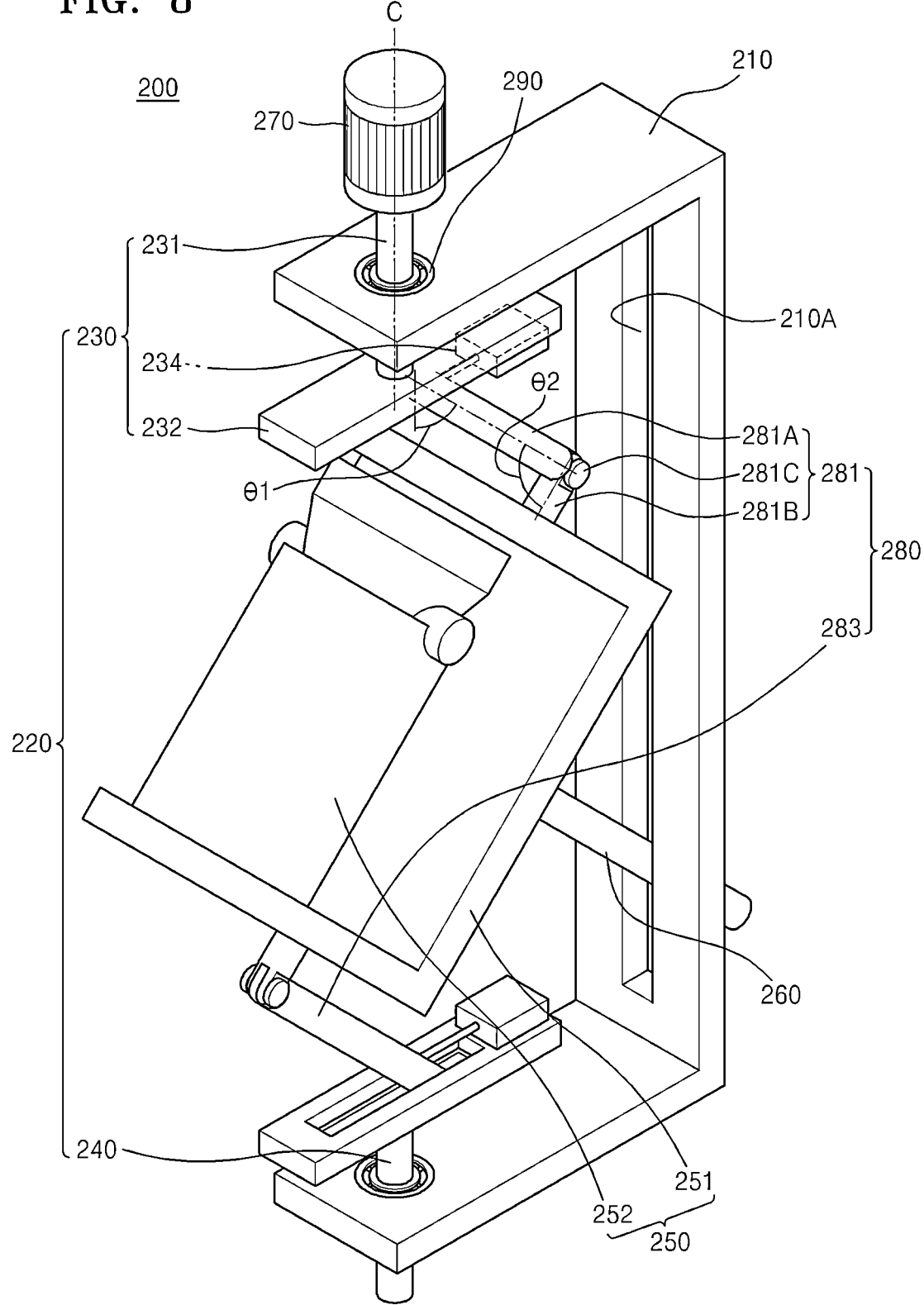
FIG. 8 is a perspective view illustrating a laser sensor assembly according to still another embodiment.

FIG. 8 is a perspective view illustrating a laser sensor assembly 200 according to still another exemplary embodiment. Referring to FIG. 8, the laser sensor assembly 200 may include a supporting unit 210, a rotary shaft unit 220, a connecting link unit 280 and a laser sensor unit 250. The laser sensor assembly 200 may further include a guiding unit 260 and a driving unit 270. Also, a guiding hole 210A is formed in the supporting unit 210, and the laser sensor unit 250 may include a bracket 251 and a laser sensor 252.

The supporting unit 210, the laser sensor unit 250, the guiding unit 260 and the driving unit 270 are similar to a supporting unit 110, a laser sensor unit 150, a guiding unit 160, and a driving unit 170 in FIG. 4. Thus, description thereof will be omitted. Also, the bracket 251 and the laser sensor 252 are similar to a bracket 151 and a laser sensor 152 in FIG. 4. Thus, description thereof will be omitted.

The rotary shaft unit 220 may be provided in plural numbers. The rotary shaft unit 220 may include a first rotary shaft unit 230, and a second rotary shaft unit 240 disposed to face the first rotary shaft unit 240. The first and second rotary shaft units 230 and 240 may be formed respectively between the bracket 251 and the supporting unit 210. Since the first and second rotary units 230 and 240 are similar to each other, only the first rotary shaft unit 230 will be described in detail hereinafter.

The first rotary shaft unit 230 may include a first rotary shaft 231 rotatably formed on the supporting unit 210. Here, a bearing 290 may be disposed between the first rotary shaft 231 and the supporting unit 210, to reduce friction caused by the rotation of the first rotary shaft 231.

Also, the first rotary shaft unit 230 may include a first rotary plate 232 coupled to the first rotary shaft 231. The first rotary plate 232 may be formed in various shapes. For example, the first rotary plate 232 may be formed as a circular or rectangular shape. Hereinafter, for the convenience of description, the embodiment will be described with respect to a case of the rotary plate 232 formed as a rectangular shape in detail.

One end of a first connecting link 281A may be coupled to the first rotary plate 232. Also, the first rotary plate 232 may include a first linear guiding unit (not shown) in which the other end of a first connecting link 251A is coupled thereto to be linearly moved.

The first linear guiding unit may be formed in various ways. In specific, the first linear guiding unit may be formed as a linear guiding groove, in which one end of the first connecting link 281A inserted and linearly moves in. Also, the first linear guiding unit may be formed as a linear guiding hole, in which one end of the first connecting link 281A inserted and linearly moves in. Hereinafter, for the convenience of description, a case where the first linear guiding unit is formed as a linear guiding hole will be described in detail.

The first rotary shaft unit 230 may include a first angle adjusting unit 234, which is provided on the first rotary plate 232 or supporting unit 210 and linearly moves one end of a first connecting link unit 281 which is coupled to the first rotary shaft unit 230. The first angle adjusting unit 234 may be formed in various ways. For example, the first angle adjusting unit 234 may include a variable-length cylinder which is coupled to one end of the first connecting link unit 281. Also, the first angle adjusting unit 234 may include a motor unit and a gear unit, which are respectively coupled to one end of the first connecting link unit 281 and the first linear guiding unit, or vice versa. Hereinafter, for the convenience of description, a case where the first angle adjusting unit 234 includes a cylinder will be described in detail.

The laser sensor assembly 200 may include the connecting link unit 280 which is coupled to the rotary shaft unit 220 and the laser sensor unit 250. Here, the connecting link unit 280 may be provided in plural numbers. For example, the plurality of the connecting link units 280 may include the first connecting link unit 281 and a second connecting link unit 283 which is disposed to face the first connecting link unit 281. Since the first and second connecting link units 281 and 283 are formed similarly, hereinafter, the detailed description will mainly describe the first connecting link unit 281.

The first connecting link unit 281 may include the first connecting link 281A, which forms a first angle $\theta 1$ with respect to the first rotary shaft 230 and coupled thereto to be linearly movable therewith. As described above, one end of the first connecting link 281A may be inserted in the first linear guiding unit and coupled to the first angle adjusting unit 234.

The first connecting link unit 281 may include a second connecting link 281B which forms a second angle $\theta 2$ with respect to the first connecting link 281A and coupled thereto and to the laser sensor unit 250. The second connecting link 281B may be connected to the bracket 251.

Also, the first connecting link unit 281 may include a second angle adjusting unit 281C which is provided between the first and second connecting links 281A and 281B to adjust the second angle $\theta 2$. Since the second angle adjusting unit 281C may be similarly controlled as the first angle adjusting unit 234, detailed description thereof will be omitted.

The first angle $\theta 1$ and the second angle $\theta 2$ may be different from each other, and may be formed similarly to the first and second angles $\theta 1$ and $\theta 2$ of FIG. 2.

Hereinafter, operation of the laser sensor assembly 200 according to the present embodiment will be described in detail.

Figure 9:
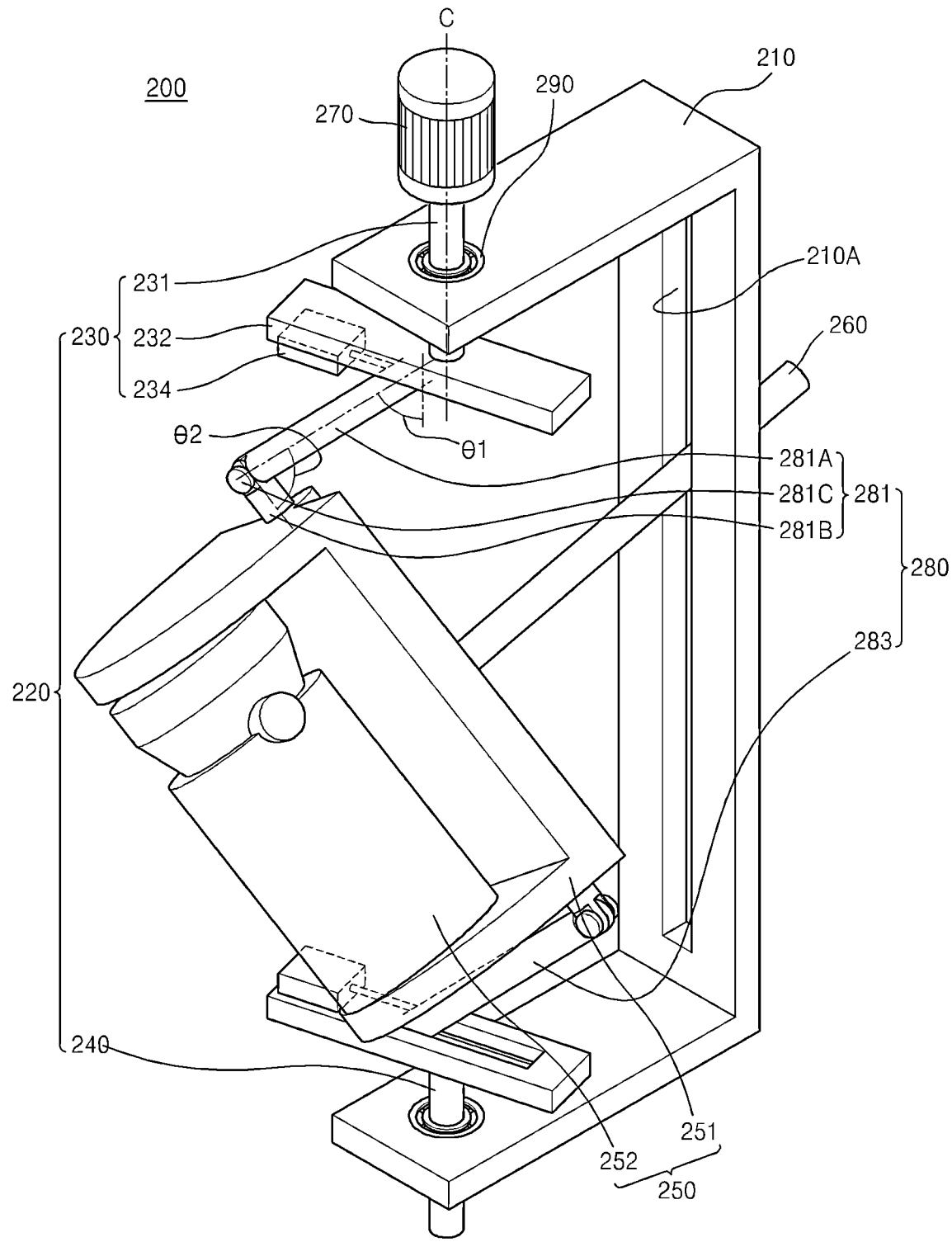
FIG. 9 is an operation view illustrating a first operation of the laser sensor assembly of FIG. 8, according to an exemplary embodiment.
Figure 10:
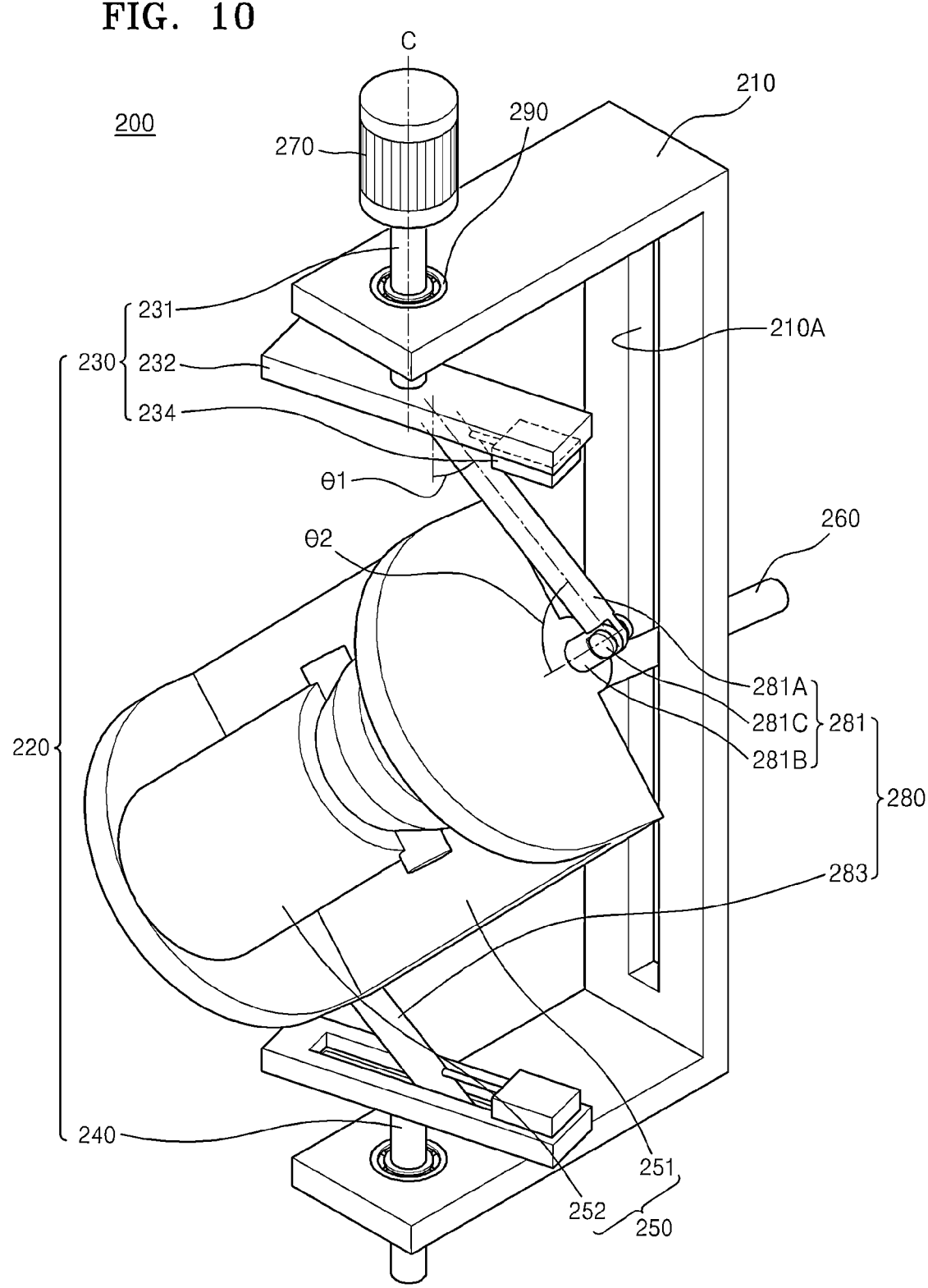
FIG. 10 is an operation view illustrating a second operation of the laser sensor assembly of FIG. 8, according to an exemplary embodiment.

FIG. 9 is an operation view illustrating a first operation of the laser sensor assembly of FIG. 8. FIG. 10 is an operation view illustrating a second operation of the laser sensor assembly of FIG. 8.

Referring to FIGS. 9 and 10, the operation of the laser sensor assembly 200 may be similar to those of the laser sensor assembly described in FIGS. 5 through 7. In specific, when an external device is moved, the laser sensor assembly 200 may be operated. As described above, the external device may include a controlling unit (not shown) and a speed sensor (not shown).

When the external device moves as described above, the controlling unit may operate a driving unit 270. The driving unit 270 may rotate the first rotary shaft unit 230. In specific, the driving unit 270 may be coupled to the first rotary shaft 231 and rotate the first rotary shaft 231.

When the first rotary shaft 231 may rotate the first rotary plate 232, the first connecting link unit 281 which is connected to the first rotary plate 232 may be rotated. In specific, the first connecting link 281A may rotate in a state of forming a first angle $\theta 1$ with respect to the first rotary plate 232. In other words, one end of the first connecting link 281A may rotate along with the first rotary plate 232.

During the operation as described above, the first angle adjusting unit 234 may fix the first connecting link 281A to maintain the first angle $\theta 1$. The first angle adjusting unit 234 may fix a length of the first connecting link 281A to a certain length to maintain the first angle $\theta 1$.

In this case, the first connecting link 281B is rotated according to the first connecting link 281A, and when the bracket 251 rotates, the laser sensor 252 may be rotated. The laser sensor 252 may twist vertically and horizontally without rotating.

In a state of operating as described above, the operation of a second rotary shaft unit 240 and a second connecting link unit 283 may be similar to that of the above-described first rotary shaft unit 230 and the connecting link unit 281.

When an external device is moving, the speed sensor may measure a moving speed. The speed sensor may transfer the measured moving speed of the external device to the controlling unit, and then, the controlling unit may calculate a speed of the laser sensor 252 based on the transferred moving speed.

The controlling unit may control the driving unit 270 according to the calculated moving speed of the laser sensor 252. Since the method of which the controlling unit controls the driving unit 270 is similar to that of FIGS. 3 to 5, detailed description of the controlling method thereof will be omitted.

Based on the calculated moving speed of the laser sensor 252, the controlling unit may control at least one of the first angle adjusting unit 234 and the second angle adjusting unit 281C. Since the method of which the first and second angle controlling units 234 and 281C are similar to each other, only the method of controlling the first angle adjustment unit 234 will be described in detail.

Based on the calculated moving speed of the laser sensor 252, the controlling unit may control the first angle adjusting unit 234 to adjust the first angle θ1. The controlling unit may adjust the first angle θ1 in proportion to the calculated moving speed of the laser sensor 252. The controlling unit may adjust the angle formed between the laser sensor 252 and the first rotary shaft 231.

In specific, if the calculated moving speed is a first moving speed, the controlling unit may control the first angle adjusting unit 134 to set the first angle θ1 as a first set angle. Also, if the calculated moving speed is a second moving speed, the controlling unit may control the first angle adjusting unit 134 to set the first angle θ1 as a second set angle.

For example, the controlling unit may adjust the first angle θ1 by changing the length of the first angle adjusting unit 234. The controlling unit may extend the length of the first angle adjusting unit 234 to reduce the first angle θ1. Otherwise, the controlling unit may shorten the length of the first angle adjusting unit 234 to increase the first angle θ1.

The first and second set angles and may be different from each other. If the first moving speed is faster than the second moving speed, the first set angle may be formed to be larger than the second set angle.

Therefore, when the first angle adjusting unit 234 is controlled as described above, if an external device is moving fast, the observation range may be narrowed. Also, if an external device is moving slowly, the observation range may be widened.

When the first angle adjusting unit 234 is being controlled as described above, the range of observation may be adjusted based on the moving speed of an external device. Therefore, objects may be sensed accurately based on the moving speed, and the external device may be controlled quickly.

The laser sensor assembly 200 according to the present embodiment may be provided on an external device to scan various ranges. The laser sensor assembly 200 of the present embodiment reduces blind spots occurring when using a related art pitching method, and may accurately sense objects. Also, in the laser sensor assembly 200 of the present embodiment, the laser sensor 252 may perform a curvilinear motion using a simple structure, and thus, a structure and a manufacturing process thereof may be simplified.

By using the laser sensor assembly 200 according to the present embodiment, the above-described motion may be embodied by a twisting motion which may cause less vibration and rotate more naturally compared to the related art pitching motion. Therefore, the laser sensor assembly 200 may embody a fast rotating speed, and thus, precisely scan objects and increase a scanning speed.

While the present invention has been particularly shown and described with reference to exemplary embodiments thereof, it will be understood by those of ordinary skill in the art that various changes in form and details may be made therein without departing from the spirit and scope of the inventive concept as defined by the following claims. The preferred embodiments should be considered in descriptive sense only and not for purposes of limitation. Therefore, the scope of the inventive concept is defined not by the detailed description of the exemplary embodiments but by the appended claims, and all differences within the scope will be construed as being included in the present inventive concept.

What is claimed is:

1. A laser sensor assembly comprising:
   a supporting unit;
   a rotary shaft unit rotatably formed on the supporting unit and having at least one portion which is bent with respect to a rotational axis of the rotary shaft unit; and
   a laser sensor unit coupled to the bent part of the rotary shaft unit so that the laser sensor unit is inclined with respect to the rotational axis of the rotary shaft unit.

2. The laser sensor assembly according to claim 1, wherein the rotary shaft unit comprises:
   a first rotary member formed on the supporting unit to be rotatable; and
   a second rotary member coupled to the first rotary member to form a first angle with respect to the first rotary member.

3. The laser sensor assembly according to claim 2, wherein the rotary shaft unit further comprises a first angle adjusting unit formed between the first and second rotary members to adjust the first angle.

4. The laser sensor assembly according to claim 2, wherein the first angle adjusting unit is configured to adjust the first angle according to a moving speed of the laser sensor unit.

5. The laser sensor assembly according to claim 2, wherein the rotary shaft unit further comprises a third rotary member of which one end is coupled to the second rotary member to form a second angle with respect to the second rotary member, and
   wherein the other end of the third rotary member is coupled to the laser sensor unit.

6. The laser sensor assembly according to claim 5, wherein the first angle and the second angle are formed differently.

7. The laser sensor assembly according to claim 5, wherein the rotary shaft unit further comprises a second angle adjusting unit formed between the second rotary member and the third rotary member to adjust the second angle.

8. The laser sensor assembly according to claim 1, further comprising:
   a guiding unit, wherein a portion thereof is inserted in the supporting unit to limit a movement of the laser sensor unit.

9. The laser sensor assembly according to claim 1, wherein an angle to bend the at least one portion of the rotary shaft unit with regard to the rotational axis of the rotary shaft unit is adjusted according to a moving speed of the laser sensor unit.

10. A laser sensor assembly comprising:
    a supporting unit;
    a rotary shaft unit formed on the supporting unit to be rotatable;
    a connecting link unit formed on the rotary shaft unit to form a first angle with respect to the rotary shaft unit, the connecting link unit being linearly movable; and
    a laser sensor unit coupled to the connecting link unit.

11. The laser sensor assembly according to claim 10, wherein the rotary shaft unit comprises:
  a rotary shaft rotatably formed on the supporting unit; and
  a rotary plate coupled to the rotary shaft and the connecting link unit, wherein the connecting link unit is coupled to form the first angle with respect to the rotary plate and is linearly movable.

12. The laser sensor assembly according to claim 11, wherein the rotary shaft unit further comprises a first angle adjusting unit formed on the rotary plate or the supporting unit, and
  wherein the first angle adjusting unit is configured to linearly move one end of the connecting link unit that is coupled to the rotary shaft unit.

13. The laser sensor assembly according to claim 12, wherein the first angle adjusting unit is configured to adjust the first angle according to a moving speed of the laser sensor unit.

14. The laser sensor assembly according to claim 10, further comprising:
  a guiding unit,
  wherein a portion thereof is inserted in the supporting unit to limit a movement of the laser sensor unit.

15. The laser sensor assembly according to claim 10, further comprising:
  a driving unit coupled to the rotary shaft unit and is configured to rotate the rotary shaft unit.

16. A method of controlling a laser sensor assembly, the method comprising:
  rotating a rotary shaft unit provided to form a certain angle with respect to a moving direction of an external device on which the laser sensor assembly is installed;
  scanning a front side of the external device in two dimensions by using a laser sensor unit which rotates according to the rotation of the rotary shaft unit; and
  converting data of the two-dimensionally scanned front side of the external device to three-dimensional data and displaying the three-dimensional data.

17. The method of claim 16, wherein the laser sensor unit is configured to rotate and linearly move up and down simultaneously.

18. The method of claim 16, wherein the laser sensor unit is disposed to form a certain angle with the rotary shaft unit.

19. The method of claim 18, wherein the angle formed between the rotary shaft unit and the laser sensor unit changes according to a moving speed of the external device.

20. The method of claim 16, wherein the rotary shaft unit is configured to be rotated by a driving unit which is coupled thereto.

* * * * *